3,808,286
CONTINUOUS POLYBUTENE PRODUCTION PROCESS WITH CATALYST DEACTIVATION BY ETHYLENE GLYCOL-ALUMINUM CHLORIDE COMPLEX
Sven A. Olund, San Rafael, Calif., assignor to Chevron Research Company, San Francisco, Calif.
Filed Dec. 26, 1972, Ser. No. 318,062
Int. Cl. C07c *3/18*
U.S. Cl. 260—683.15 B      5 Claims

ABSTRACT OF THE DISCLOSURE

Continuous process for the production of polybutenes by polymerization of olefin with aluminum chloride catalysts and deactivating the catalyst with recycled ethylene glycol-aluminum chloride complex.

BACKGROUND OF THE INVENTION

Field of the invention

Figure 1:
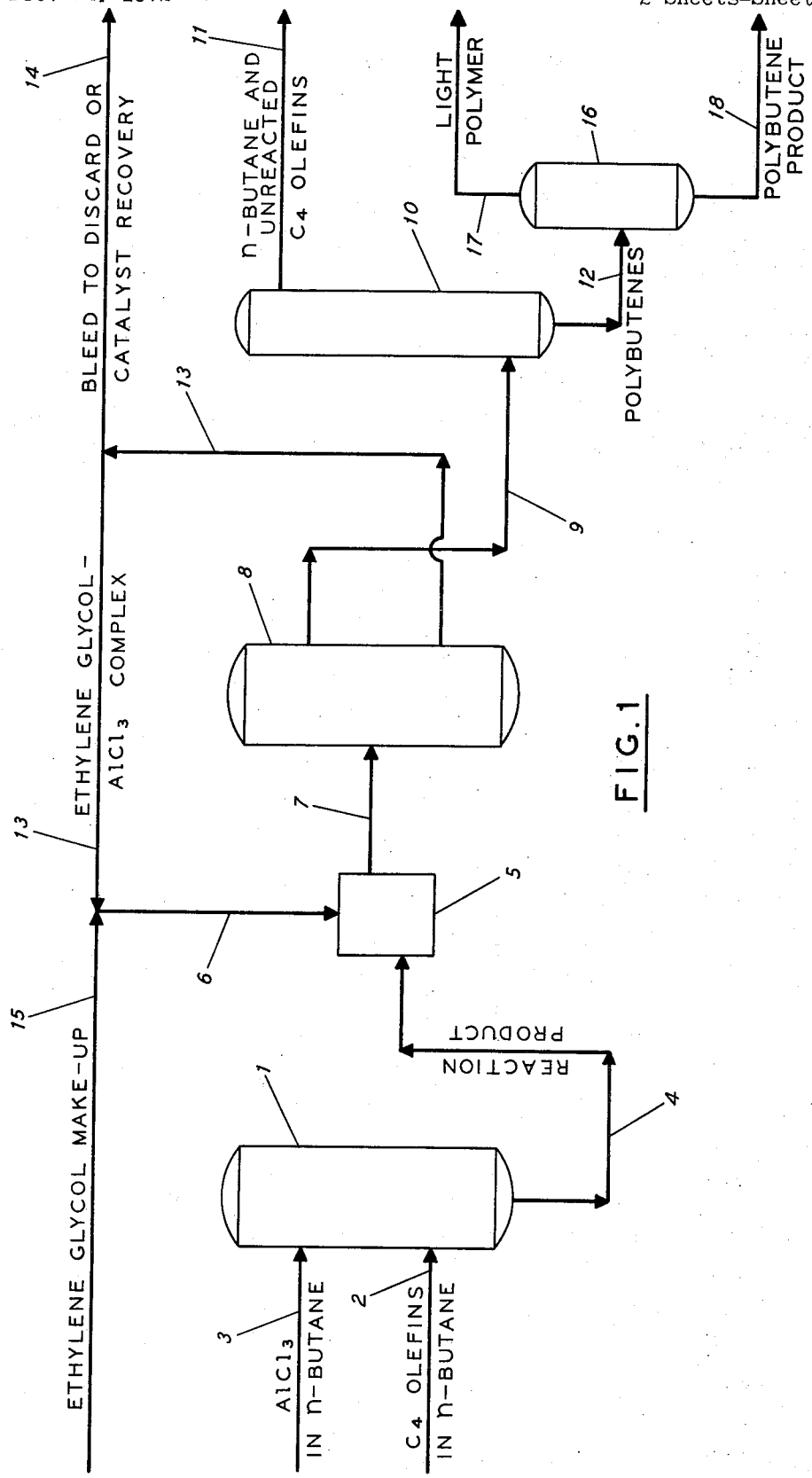

This application is concerned with a process for producing high or medium molecular weight polybutenes by a polymerization of butene with aluminum chloride-hydrocarbon complex catalyst, and is more particularly concerned with a method of catalyst quenching and removal which provides polymers of controlled molecular weight range, which by virtue of the particular quenching and catalyst removal process are of high clarity without a costly filtration step.

It has long been known that normally gaseous olefins in particular the butenes, can be converted to viscous liquid polymers by contacting the butenes in liquid phase, and usually in the presence of saturated hydrocarbon carriers, usually butanes, with aluminum chloride or aluminum chloride hydrocarbon complex catalyst. The viscosity of the polymers produced may be controlled by regulating the catalyst concentration and reaction time and temperature. The polymers which are produced are withdrawn from the reaction zone and separated from catalyst, unreacted butenes and hydrocarbon carrier. Rapid deactivation or separation of the catalyst is necessary because the presence of the catalyst in an activated state during an extended separation process will result in after-reaction wherein residual quantities of unreacted butene will continue to polymerize yielding substantial quantities of undesirable low molecular weight material. Further, discoloration and color instability of the final polybutene product may result.

Thus, it is necessary to either deactivate (quench) or remove the catalyst from the reaction mixture immediately after it leaves the polymerization zone. Rapid removal has been accomplished by such methods as settling or centrifugation; but these methods generally do not give complete separation of catalyst and polymer and in some cases involve the use of equipment which of necessity is costly and requires substantial control and maintenance. On the other hand, various methods of catalyst deactivation or quenching have been employed various quenching materials which are usually introduced into the reaction mixture immediately after it leaves the reaction zone. Examples of quenching materials which have been employed include such materials as alcohols, ammonia, sodium hydroxide, and sulfur dioxide. A problem commonly encountered with the use of such quenching agents is that after quenching is accomplished with the agent, the agent and the product that it forms with aluminum chloride must be removed by contact with another material. For example, liquid ammonia is used as an extractant in the case of the quenching with ammonia, and water, in the case of the other agents. The use of liquid ammonia requires sepcial handling techniques, and the use of water as an extracting agent requires filtration through a bed of solid particle such as clay, carbon, mole sieves, diatomaceous earth, etc. Aging of the bed usually results in the formation of a haze in the final product, which is quite difficult to remove from the butene polymer.

DESCRIPTION OF THE PRIOR ART

U.S. Pat. No. 2,099,090 discloses a process for the polymerization of olefin hydrocarbons at low temperatures in the presence of metal halide catalysts to produce high molecular weight olefin polymers. The patent is particularly directed to the polymerization process carried out at temperatures below $-40°$ F., wherein the reaction is quenched by adding certain "fluid hydrolytic agents" such as alcohols and ketones to the mixture. Ethyl alcohol, particularly 95% ethyl alcohol, is the preferred hydrolytic agent. Also included are ammonia, glycol, glycerol, ethyl ether, methyl ether, methanol, isopropyl alcohol, acetone, methyl ethyl ketone, furfuryl, acetaldehyde, etc. It is preferred that a small amount of water, usually less than 10%, be included with the hydrolytic agent.

U.S. Pat. No. 2,786,828 discloses and claims a method of deactivating metal halide catalysts by addition to the reaction mixture of dilute aqueous caustic containing between 10 and 120 mol percent excess of sodium hydroxide over that theoretically necessary to react with a catalyst. The deactivated catalyst is removed by water extraction.

U.S. Pat. No. 3,200,169 discloses and claims anhydrous ammonia as a deactivating agent; the ammonia-catalyst complex being removed by solution in liquid ammonia.

U.S. Pat. No. 2,521,940 discloses a method of catalyst quenching by the formation of an alcohol-catalyst complex, which is removed with water.

SUMMARY OF THE INVENTION

An improved process for the production of polybutenes has been discovered which comprises contacting a butene-containing hydrocarbon feed with an aluminum chloride-hydrocarbon complex catalyst in a reaction zone, removing the reaction product which is a mixture of polybutene polymer, unreacted butene, hydrocarbon carrier, and aluminum chloride-hydrocarbon complex, contacting the mixture with an aluminum chloride-ethylene glycol complex in which the amount of aluminum chloride in the complex is from about 5 to 80%, preferably from about 15 to 25% by weight, to form a second admixture. The second admixture comprises butene polymer, unreacted hydrocarbon and aluminum chloride-ethylene glycol complex. The second admixture is then introduced to a settling zone wherein it is allowed to separate and form two layers, the upper layer comprising polybutene polymer, unreacted butenes and hydrocarbon carrier, and the lower layer comprises aluminum chloride-ethylene glycol complex. The upper layer is removed. It is usually passed to a flasher where the hydrocarbon carrier, low molecular weight polymers and unreacted butenes are removed by distillation and the polybutene polymer recovered as a bottoms product. The lower layer from the settler is removed and a major portion returned to mix with the effluent from the polymerizing zone to effect the quenching and removal of additional aluminum chloride catalyst, and a minor portion of the lower layer is removed or bled off and discarded. Sufficient ethylene glycol is introduced into the recycled complex to replenish that removed in the bleed. The quantity of the lower layer removed along with the fresh added glycol must be sufficient to maintain the aluminum chloride concentration of the complex within the previously prescribed range of 5% to 80%.

The make-up ethylene glycol may be introduced directly into admixture 1 at the mixer, rather than into the aluminum chloride-ethylene glycol complex recycle stream.

The butene-containing hydrocarbon feedstock comprises essentially hydrocarbons, preferably those derived from the olefin-containing gases produced in the thermal or catalytic cracking of petroleum oils, distillates, or residual, although other olefin-containing materials may be employed. The feed should contain in major part hydrocarbons having 4 carbon atoms per molecule, and hence may contain substantial quantities of butanes, 1- and 2-butenes, and isobutene. While isobutene is the most desirable olefin feed for the polymerization, it is advantageous to employ a feed mixture containing other butenes which enter the polymerization to a lesser extent, and butanes which, in the most part, serve as a diluent in the process, adding fluid to the reaction mass, and dissipating the heat of the polymerization reaction.

In one embodiment of the invention, the hydrocarbon feed is washed, first with caustic and then with water, to remove acidic and water-soluble impurities. It is then dried and passed to the polymerization reactor.

The catalyst is usually prepared by dissolving aluminum chloride in an inert hydrocarbon solvent, such as butane, propane, isobutane, etc. The concentration of catalyst in the reaction zone may be controlled either by regulating the rate of feed of the catalyst solution to the reactor or by controlling the concentration of aluminum chloride in the solvent. A desirable concentration may be selected by regulating the temperature while saturating the solvent with catalyst. Higher temperatures permit higher catalyst concentration. If desired, a slight excess of solvent may be employed to avoid deposition of aluminum chloride in subsequent conduits should the temperature drop slightly. After saturation, the catalyst solution is passed to the polymerization reactor. The saturation temperature of the solvent and the flow rate of the catalyst solution into the polymerization reactor are controlled so that aluminum chloride is fed to the reactor in an amount of from about 0.01 to 5.0 pounds, preferably 0.03 to 1.0 pound of aluminum chloride per barrel of hydrocarbon feed. The reactor is maintained under superatmospheric pressure sufficient to maintain the reactants in the liquid phase. To achieve this, the various streams are delivered to the reactor at elevated pressures. The reactor is maintained at a temperature within the range of about 0° F. to 200° F., preferably 40° F. to 120° F., depending upon the rate of catalyst feed to the reactor and the desired viscosity of the polymer produced. Residence time of the olefin in the reactor may be from about 5 to 60 minutes or longer in certain cases.

The total effluent from the polymerization reactor is then intimately contacted with the ethylene glycol-aluminum chloride complex. Contact should be effected before temperature of the effluent has increased significantly over that maintained in the polymerization reactor. The new admixture produced is then passed to the settler wherein the aluminum chloride-ethylene glycol complex separates and settles to the lower part of the settler. The upper layer of butene polymer dissolved in the hydrocarbon feed is then withdrawn and further processed. The aluminum chloride-ethylene glycol complex is withdrawn from the lower part of the settler, and a sufficient but minor quantity is withdrawn. The withdrawn complex is either discarded or saved for catalyst regeneration to prevent a never-ending aluminum chloride buildup in the complex stream. The major portion is returned to mix with the polymerization reactor effluent (admixture I) to form admixture II. Sufficient make-up ethylene glycol to compensate for that removed in the bleed stream is added either directly to the aluminum chloride-ethylene glycol complex or to the mixer or to the effluent line at a point close to that used for the introduction of the glycol-containing complex into the reactor effluent (admixture I).

In order to understand in more detail the preferred embodiment of the invention, reference can be made to the following detailed descriptions read together with the attached drawings, which are schematic flow diagrams of the process steps by which the invention can be practiced. The procedure of FIG. 1 is preferred.

Catalyst preparation is conventional and is not illustrated but is described as follows: A hydrocarbon storage vessel may be conventional storage facilities or it may be the effluent conduit from a suitable hydrocarbon production facility.

The hydrocarbon stream is passed from the storage vessel through a caustic wash and water wash to remove acidic and water-soluble impurities. This stream is finally dried in a drier and passed to the polymerization reactor 1 through line 3.

Aside from hydrocarbon storage vessel, there is provided a butane storage vessel from which butane is passed through a drier to an aluminum chloride saturator. The aluminum chloride saturator conveniently comprises an elongated tube or tubes filled with dry aluminum chloride and equipped with variable heating means. The saturator is maintained at a constant temperature, and butane is passed through it at a sufficiently low rate so that it becomes substantially saturated with aluminum chloride. A small portion of butane from the drier is passed through a butane bypass line and introduced into the effluent stream from the saturator in order to reduce the aluminum chloride concentration and thereby avoid deposition of aluminum chloride in subsequent conduits. The butane stream containing aluminum chloride is then passed to the reactor 1 through line 2. Control of the temperature of saturator and the butane flow rate therethrough control the rate of aluminum chloride catalyst feed to the reactor 1. The temperature and butane flow rate are controlled so that the aluminum chloride is fed to the reactor in an amount of from 0.01 to about 5.0 pounds of aluminum chloride per barrel of hydrocarbon feed, that is, in an amount of from about 0.2 to 2.5 pounds of aluminum chloride per barrel of isobutene in the feed.

Reactor 1 is maintained under superatmospheric pressure sufficient to maintain the reactants in liquid phase; and, accordingly conduits leading to the reactor are provided with the pumps necessary to deliver the various streams to the reactor at elevated pressures. The reactor is maintained at a temperature within the range of about 0° F. to 200° F., depending upon the rate of aluminum chloride feed and the desired viscosity of the polymer product. The residence time of the olefin in the reactor may be from about 5 to 60 minutes or longer.

The product from reactor 1 (admixture I) is withdrawn from the bottom through line 4 and passed to mixer 5. Admixture I comprises butene polymer, unreacted butenes, aluminum chloride-hydrocarbon complex, and hydrocarbon carrier. Aluminum chloride-ethylene glycol complex and optionally make-up ethylene glycol is introduced into line 4 which may contain a power or stationary mixer 5 to form below the point of entry admixture II, which will contain substances as previously defined.

Admixture II in line 7 is then passed to settler 8 where an upper and a lower phase are allowed to form. The lower phase, which comprises aluminum chloride-ethylene glycol complex, is withdrawn through line 13 and returned to mixer 5. A sufficient quantity of effluent is withdrawn from the system through line 14 to maintain the desired concentration of aluminum chloride in the cyclic complex solution. Preferably this concentration is in the range of 10% to 40% by weight. Ethylene glycol is a quantity sufficient to replace the ethylene glycol removed in the bleed is introduced through line 15.

The upper phase from settler 8 is then passed through line 9 to the first stage flash 10 where unreacted hydrocarbons containing predominantly four carbon atoms per molecule are separated through line 11. This flash stage is preferably maintained at 350° F. to 450° F. and about 3 to 6 atmospheres of pressure. The polymer-containing stream remaining in vessel 10 is withdrawn through line 12 and passed to second stage flash 16, where light polymers are removed overhead through line 17. This flash stage is preferably maintained at a temperature of from 350° F. to 450° F. and at a pressure of 10 to 200 mm. of mercury. The polymer product is withdrawn from vessel 16 through line 18.

Figure 2:
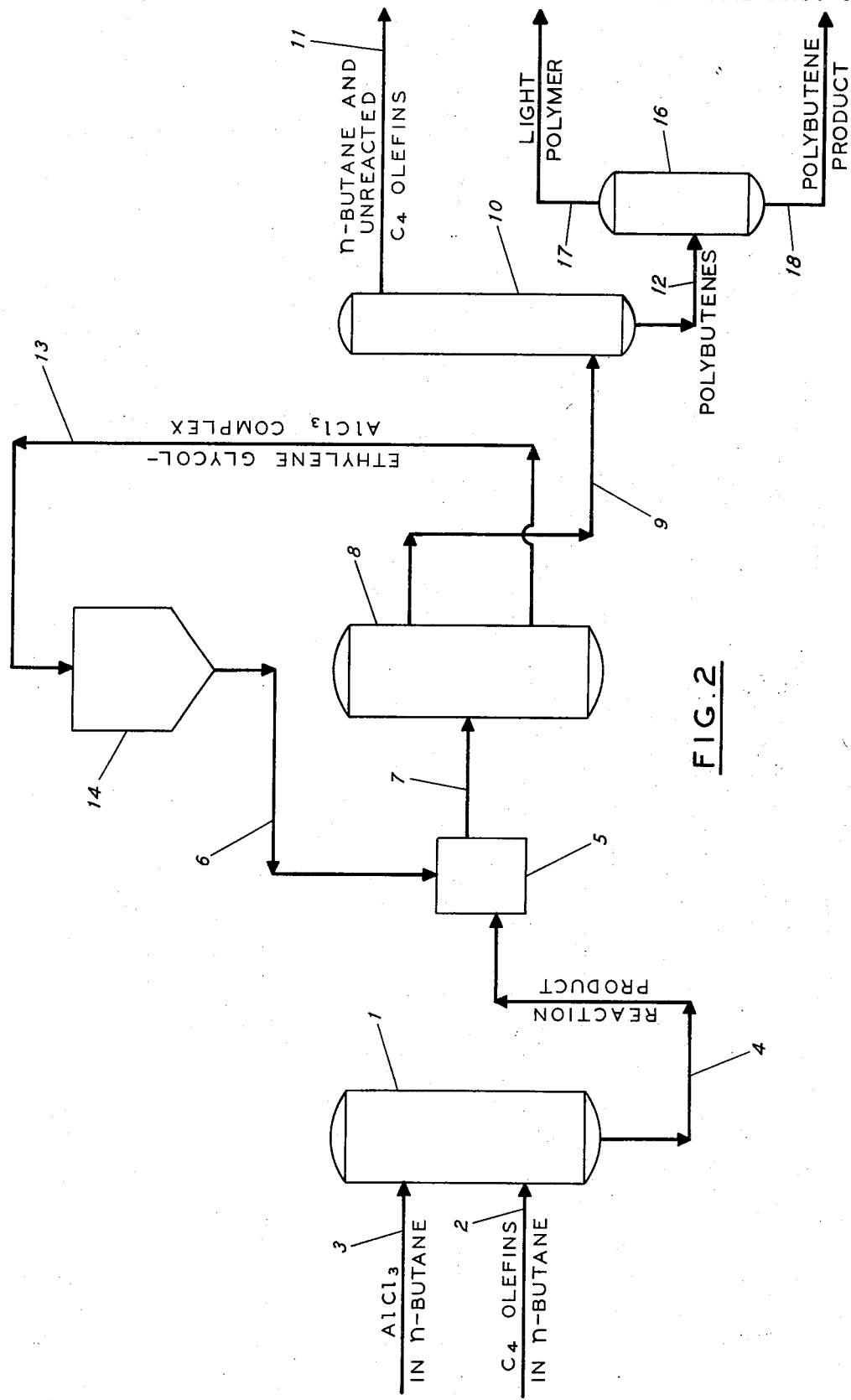

As illustrated in FIG. 2, in a variation of the process described above, a holding tank 14 sufficient to hold a large quantity of material is charged with ethylene glycol and positioned in the recycle line. A sufficient quantity of ethylene glycol is placed in the tank to maintain the process for several days. At first the glycol and then the aluminum chloride-glycol complex is pumped into the mixing zone 5. No additional ethylene glycol is added. The reaction is allowed to continue until the amount of aluminum chloride in the holding tank approaches the desired concentration. This may be as much as 40% by weight, but preferably about 20%. The aluminum chloride-ethylene glycol complex may be replaced by fresh ethylene glycol without interrupting polymerization, simply by pumping the fresh glycol directly into mixing zone 5 while draining vessel 14. This process is illustrated in FIG. 2 with lines 14 and 15 as used in FIG. 1 no longer necessary and the other features of the illustrated process of FIG. 1 remaining the same.

When the process is practiced in accordance with the above description, clear, bright polymers free of aluminum and chlorine, having a uniform high viscosity, and a narrow range of molecular weights can be produced. The viscosity of the polymer produced can be controlled accurately by controlling the hydrocarbon feed rate to reactor 1, and the temperature of the reactor. The polymers are produced clear and bright without the necessity of a clay or other particulate solid filtration, as heretofore necessary.

The process of this invention having been described in detail is further illustrated by the following examples in which the process was practiced as described above. The examples are intended to be illustrative and non-limiting.

EXAMPLE 1

Polymerization catalyst deactivation with aluminum chloride-ethylene glycol complex The following preparation of polybutene polymer was carried out by a process basically as shown in FIG. 2. A reactor comprising a stirred tank having an overflow take-off for product removal was charged through an inlet line with 54 barrels per hour of a feed having the following composition.

| Compound: | Percent |
|---|---|
| Isobutene | 22.0 |
| 1- and 2-butene | 30.0 |
| Butane | 46.5 |
| Propane | 0.5 |

At the same time a solution comprising 0.75 lb. of aluminum chloride per barrel of butane was charged to the reactor through a separate inlet line at an average rate of about 5.6 barrels per hour. The reactor was maintained at a temperature of about 50° F. and a pressure of about 45 p.s.i.g. The product was continuously removed after an average residence time of 30 minutes. The product was transferred to a mixing zone wherein the reactor product stream was thoroughly mixed with an average of 2,350 lbs. per hour of an aluminum chloride-ethylene glycol complex containing from 0.0 (at start-up) to 0.17 (at end of run) lb. of aluminum chloride per lb. of ethylene glycol. The total inventory of ethylene glycol in the entire system was 3,750 pounds.

The resulting mixture was passed to a settler and allowed to separate into two phases. The settler was maintained at a temperature of about 52° F. under pressure of about 100 p.s.i.g. and had an average residence time of about 1 hour. The upper phase continuously passed out of the settler via a discharge line into a two stage stripping zone. In the stripping zone unrecated butenes, butanes and low molecular weight polymers were removed overhead at a combined rate of 44 barrels per hour. The polybutene product was removed from the stripping zone at a rate of about 7.4 barrels per hour. The clear, bright polymer had an average hazen color of 30 and an average viscosity of about 1,700 SUS measured at 210° F., corresponding to a molecular weight of about 1,500. Aluminum chloride concentration was nil by ASTM D-878. This product had an average power factor of 0.035% (at 210° F., 60 cps.) and an average volume resistivity of $1.5 \times 10^{15}$ ohm cm. (at 210° F.).

After a continuous run of seven days, the aluminum chloride concentration in the complex stream was 17% by weight. The product had the average analytical values as given above. At this time, fresh glycol, 3,750 pounds, was charged to the system while simultaneously draining out the complex mixture. The run was then continued as before.

EXAMPLE 2

Polymerization catalyst deactivation removal with sodium hydroxide

The reaction procedures set forth in Example 1 were followed. However, when the effluent from the reactor was removed, it was contacted in the mixing zone with 150 lbs. per hour of 10% aqueous sodium hydroxide. The material was then removed to a settler and the lower aqueous phase containing the aluminum chloride catalyst was removed. The upper phase was passed through a bed of clay and then passed to the two stage stripping zone and treated in the same manner as set forth in Example 1 to produce polybutene product. This product had an average hazen color of 60; a power factor of 0.10% and a volume resistivity of $4.5 \times 10^{13}$ ohm cm.

EXAMPLES 3 AND 4

Polybutene of higher viscosity

Essentially the same procedure was used as in Example 1 and 2, except that the quantity of catalyst was decreased to give a higher molecular weight product. The following results were obtained upon analyzing the product.

| | Quenching agent | |
|---|---|---|
| | Ethylene glycol | Caustic/clay |
| Viscosity, SUS at 210° F | 4,215 | 7,767. |
| Appearance | Clear and bright | Cloudy. |
| Color, Hazen | 30 | 50. |
| AlCl₃ | Nil | Nil. |
| Power factor, 60 c.p.s. at 210° F.: | | |
| Before aging | 0.02 | 0.035. |
| After aging (96 hrs. at 240° F.) | 0.02 | 0.045. |

What is claimed is:

1. In a process for continuously polymerizing butenes comprising:
    (1) contacting in liquid phase a butene containing hydrocarbon feed with aluminum chloride in a polymerization zone whereby there is formed a first mixture of a polybutene polymer, aluminum-chloride hydrocarbon complex, unreacted butene, and saturated hydrocarbon carrier;
    (2) withdrawing said first mixture from said polymerization zone; and
    (3) separating polybutene polymer, unreacted butene and saturated hydrocarbon carrier from said first mixture; the improvement which comprises
        (a) contacting said first mixture in a mixing zone with aluminum chloride-ethylene glycol complex to form a second mixture, wherein the weight percent of aluminum chloride in the complex is from about 5 to 80;

(b) passing said second mixture to a settling zone to form an upper phase comprising butene polymer, unreacted butene, and hydrocarbon carrier, and a lower phase comprising aluminum chloride-ethylene glycol complex;

(c) separating the phases;

(d) recycling the major portion of said lower phase to said mixing zone to provide the aluminum chloride-ethylene glycol complex which is contacted in (a) with said first mixture; and (e) introducing sufficient ethylene glycol into said recycled complex to maintain the requisite amount of aluminum chloride in the complex.

2. The process of claim 1 in which the weight percent of aluminum chloride in the complex employed in (a) is from 10 to 40.

3. The process of claim 1 in which the temperature of the polymerization zone is from about 0° to 200° F.

4. The process of claim 1 in which the temperature of the polymerization zone is from 40° to 120° F.

5. The process of claim 1 wherein the aluminum chloride-ethylene glycol complex which is recycled in step (d) is passed through an ethylene glycol holding tank, said tank being filled with sufficient ethylene glycol to maintais the requisite aluminum chloride ratio for an extended period.

References Cited
UNITED STATES PATENTS

| | | | |
|---|---|---|---|
| 2,521,940 | 9/1950 | Oriolo | 260—683.15 B |
| 3,024,293 | 3/1962 | Nelson et al. | 260—683.15 B |

PAUL M. COUGHLAN, JR., Primary Examiner